March 1, 1949.　　　W. W. WALLACE　　　2,463,446
COMBINATION GAS TANK AND VALVE MECHANISM
Filed May 3, 1947
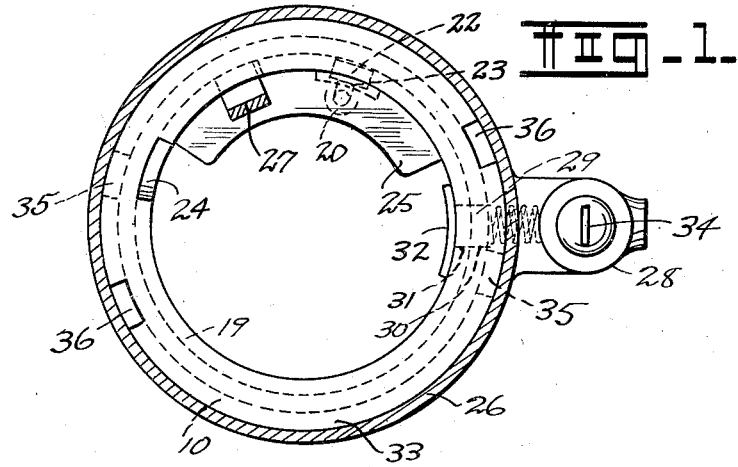
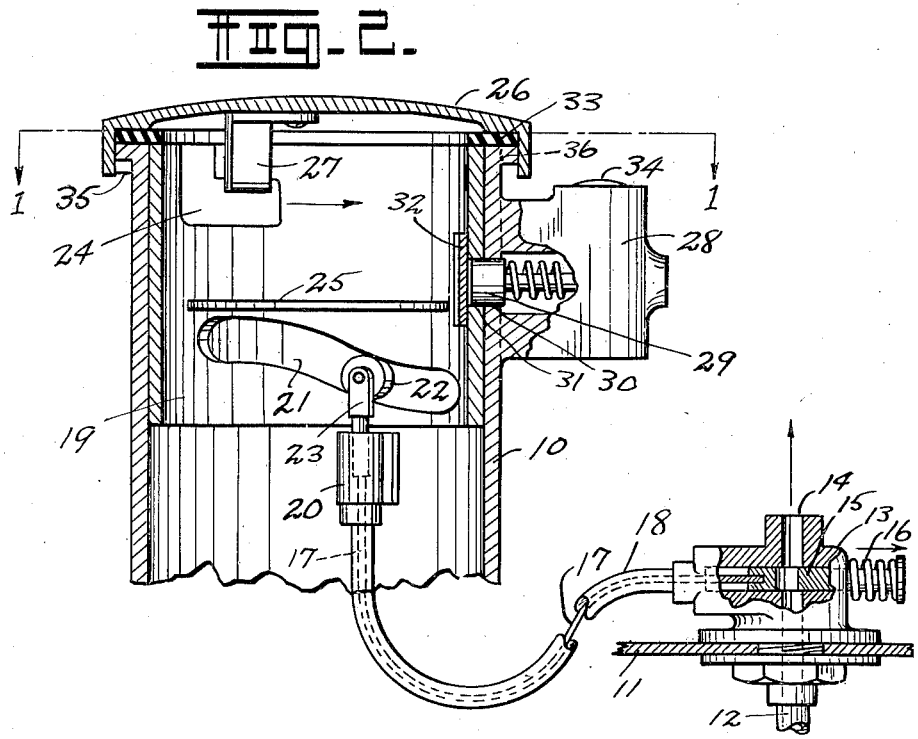
INVENTOR.
Wayne W. Wallace.
BY
ATTORNEY.

Patented Mar. 1, 1949

2,463,446

UNITED STATES PATENT OFFICE 2,463,446

COMBINATION GAS TANK AND VALVE MECHANISM

Wayne W. Wallace, Youngstown, Ohio

Application May 3, 1947, Serial No. 745,888

6 Claims. (Cl. 137—21)

This invention relates to a motor vehicle and more particularly to the gasoline tank and fuel supply line in communication therewith and means for locking the said tank closing the said fuel supply communicating means.

The principal object of the invention is the provision of a gasoline tank lock and remotely situated fuel supply controlling valve and means interconnecting the same for interdependent operation.

A further object of the invention is the provision of a combination gas tank lock and valve mechanism wherein the gas tank cap may be applied and removed in a normal manner without actuating the locking mechanism.

A still further object of the invention is the provision of a combination gas tank lock and valve mechanism wherein a gas tank cap may be applied to the filling spout of the gas tank and turned thereon to actuate the lock means for securing the said cap thereon and closing the fuel supply means in communication with the said tank.

A still further object of the invention is the provision of a combination gas tank lock and valve mechanism which will enable an automobile to be locked to prevent the theft thereof by positively closing the fuel supply line thereof and insuring the maintaining of the valve in closed position until opened by an authorized person.

The combination gas tank lock and valve mechanism shown and described herein has been designed to enable an automobile to be rendered incapable of being driven and thereby effectively prevent unauthorized persons from stealing the automobile equipped with the device. The device may be produced in the form of an accessory which may be affixed in place of a portion of the usual filling spout of the gasoline tank of an automobile or it may obviously be installed in the gasoline tank and filling spout thereof at the time of the initial fabrication or manufacture thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of a portion of a gasoline tank filling spout showing a locking mechanism affixed therewith.

Figure 2 is a vertical cross section of a portion of a gasoline tank filling spout showing the locking mechanism in connection therewith and a remotely situated fluid valve.

By referring to the drawings and Figures 1 and 2 in particular it will be seen that a gasoline tank filling spout has been illustrated and indicated by the numeral 10 and may obviously comprise the uppermost end portion of such a filling spout as found in present day automobiles wherein an intermediate flexible section is incorporated for connecting the filling spout with the gasoline tank, a portion of which is illustrated and indicated by the numeral 11. A fuel supply line 12 is in communication with the gasoline tank 11 by way of a valve 13 which includes an inlet orifice 14 and a valve member 15 which controls the fuel flowing through the inlet orifice 14 into the supply line 12. The valve member 15 is slidably positioned in the valve 13 and normally biased into open position by means of a spring 16 in connection therewith. Means comprising a flexible shaft 17 is provided to move the valve member 15 into closed position. The flexible shaft 17 is preferably carried in a flexible conduit 18 so that it can be extended along the interior of the gasoline tank 11 and up the filling spout 10. Means is positioned in the filling spout 10 for imparting movement to the flexible shaft 17 whereby the valve member 15 is moved into closed or open position, as desired.

The filling spout 10 has a sleeve 19 rotatably positioned therein and supported by means of a boss 20. The sleeve 19 has a diagonally formed cam slot 21 therein. A roller 22 engaging the upper and lower surfaces of the cam slot is affixed to a bracket 23 which in turn is attached to one end of the flexible shaft 17 heretofore referred to. The sleeve 19 has a bayonet slot 24 formed therein and communicating with the upper end of the sleeve 19 and forming means by which the sleeve 19 may be rotated. A baffle plate 25 is formed in the sleeve immediately above the cam slot 21 and may be extended downwardly as well as outwardly if desired, to provide a protective shield over the bracket 23 so as to prevent the introduction of an element into the sleeve 19 and the engagement thereof with the bracket 23 so that the same might be moved thereby.

A cap 26 is positioned on the uppermost end of the filling spout 10 and has a downwardly depending lug 27 affixed thereto and adjacent one side thereof, the lower portion of which is adapted to enter the bayonet slot 24 so that rotation of the cap 26 will impart rotation to the sleeve 19 by way of the downwardly depending lug 27.

Means is provided for locking the sleeve 19 with respect to the filling spout 10 and consists of a lock mechanism 28 having a spring urged bolt 29 which is adapted to register with a pair of orifices 30 and 31 formed in the filling spout 10 and the sleeve 19, respectively, so that when the sleeve 19 is rotated as by the means heretofore described and the orifice 31 comes into registry with the orifice 30, the bolt 29 will move therethrough and hold the sleeve 19 in fixed position with respect to the filling spout 10. A plate 32 covers the orifice 31 in the sleeve 19 so that the bolt 29 cannot be moved by an implement inserted into the area of the sleeve 19 and the filling spout 10.

It will thus be seen that when the mechanism described is positioned on the upper, outermost end of the filling spout of an automobile gas tank and the cap 26 removed therefrom, relatively unobstructed access is provided into the interior of the gas tank 11 so that fuel may be supplied into the tank therethrough. It will also be seen that when the cap 26 is positioned on the upper end of the filling spout 10 and in registry with a gasket 33 thereon, it can be positioned thereon securely by rotating it slightly so as to engage the lug 27 in the bayonet slot 24 in the sleeve 19. For normal unlocked operation no further manipulation of the device is required. However, when it is desired to lock the cap 26 to the filling spout 10 and lock the fuel supply line in communication with the gasoline tank 10, the cap 26 is revolved additionally to rotate the sleeve 19 and thereby move the cam slot 21 and hence the roller 22 on the bracket 23 in communication with the flexible shaft 17 and thereby actuate the valve member 15 and close the fuel supply line 12. When this occurs, the orifices 31 and 30 register and the bolt 29 moves thereinto and locks the sleeve 19 with respect to the filling spout 10. It is necessary to insert a key in a keyhole 34 of the lock mechanism 28 to release the bolt 29 before the locked cap 26 and valve member 15 may be unlocked and the fuel supply again reopened.

The locking of the cap 26 is occasioned by the provision of a pair of secondary bosses 35 on the cap 26 which register with secondary bayonet slots 36 formed in the uppermost, outturned edge of the filling spout 10. Thus when the cap 26 is first positioned in registry on the filling spout 10, the secondary bosses 35 register with the secondary bayonet slots 36 and the cap may be partially turned thereon, as best shown in Figure 1, to cause it to be retained thereon. During this initial cap securing action the lug 27 on the cap 26 engages the relatively wide bayonet slot 24 and moves therein but not to the extent of becoming locked thereinto. Thus the cap 26 may be removed at will from the filling spout 10 provided the locking mechanism comprising the rotatable sleeve 19 and the bolt 29 have not been actuated.

When it is desired to lock the cap to the filling spout 10 and simultaneously lock the fuel supply line 12 by closing the valve member 15, the cap 26 is rotated in a greater degree so as to cause the lug 27 to engage the end of the bayonet slot 24 and thereby imparts rotating movement to the sleeve 19 which actuates the various locking devices, as heretofore described, the net result of which is to close the valve member 15 in the valve 13 thereby closing off the fuel supply line 12 from communication with the tank 11 and at the same time the bolt 29 engages the registering orifices 30 and 31 in the filling spout 10 and the sleeve 19, respectively, and locks the whole assembly in position. It will thus be seen that the cap 26 cannot be removed as it can be rotated partially to the extent permitted by the bayonet slot 24 but not sufficiently to enable the secondary bosses 35 on the cap to re-register with the secondary bayonet slots in the upper edge of the filling spout 10.

It will thus be seen that the several objects of the invention are met by the structure disclosed herein and that an automobile equipped with the combination gas tank lock and valve mechanism will be incapable of being driven as a fuel supply line 12 from the gas tank 11 is closed automatically when the cap 26 is revolved the full degree possible. It will also be seen that the combination gas tank lock and valve mechanism can be produced economically and installed either as an accessory or original equipment in various automobiles due to its simplicity of design and integrally connected operating parts. For example, when installed as an accessory, the device may comprise a replacement for the upper portion of the filling spout 10 of an automobile which is commonly connected with the gasoline tank 11 by means of an intermediate flexible section. It will also be seen that there are no electrical devices incorporated in the combination gas tank lock and valve mechanism or any other devices which would endanger the automobile upon which the device is installed.

Having thus described my invention, what I claim is:

1. A combination gas tank lock and valve mechanism comprising valve means in connection with the fuel supply line of a gasoline tank and valve operating means connected therewith in the filling spout of the said gasoline tank, said operating means including a sleeve rotatably positioned in the filling spout, a cap for closing the filling spout, the said sleeve operable by the said cap and the lock mechanism for locking the said sleeve with respect to the said filling spout.

2. In an automobile having a fuel tank and associated filling spout and a fuel supply line in communication with the said fuel tank, a valve in the said fuel supply tank controlling the said fuel supply line, and valve operating means in the said filling spout and means operatively connecting the said valve and valve operating means, said valve operating means including a sleeve having a cam slot formed therein and a bayonet slot formed therein, a cap for closing the said filling spout and means on the said cap for engaging the said bayonet slot of the said sleeve so as to impart motion thereto for operating the said valve.

3. In an automobile having a fuel tank and associated filling spout and a fuel supply line in communication with the said fuel tank, a valve in the said fuel supply tank controlling the said fuel supply line, and valve operating means in the said filling spout and means operatively connecting the said valve and valve operating means, said means comprising a flexible shaft, said valve operating means including a sleeve having a cam slot formed therein, means on said flexible shaft engaging the cam slot and a bayonet slot in said sleeve, a cap for closing the said filling spout and means on the said cap for engaging the said bayonet slot of the said sleeve so as to impart motion thereto for operating the said valve.

4. In an automobile having a fuel tank and associated filling spout and a fuel supply line in communication with the said fuel tank, a valve in the said fuel supply tank controlling the said fuel supply line, and valve operating means in the said filling spout and means operatively connecting the said valve and valve operating means, said means comprising a flexible shaft, said valve operating means including a sleeve having a cam slot formed therein, means on said flexible shaft engaging the cam slot and a bayonet slot in said sleeve, a cap for closing the said filling spout and means on the said cap for engaging the said bayonet slot of the said sleeve so as to impart motion thereto for operating the said valve, orifices formed in the said sleeve and the said filling spout and lock means disposed adjacent said orifices and including a bolt for engaging the said orifices when in registry so as to lock the said sleeve against rotation and the valve in closed position.

5. An accessory for attachment to an automobile fuel supply tank and comprising a substitute filling spout attachable to said tank and a valve for placement in said tank in communication with a fuel outlet thereof, the said substitute filling spout having a rotatable sleeve therein and means in connection with said valve for operating the same upon rotation of the said sleeve, a cap for closing the said substitute filling spout and means on said cap for engaging the said substitute filling spout and the said sleeve, and the said sleeve being operable thereby.

6. An accessory for attachment to an automobile fuel supply tank and comprising a substitute filling spout attachable to said tank and a valve for placement in said tank in communication with a fuel outlet thereof, the said substitute filling spout having a rotatable sleeve therein and means in connection with said valve for operating the same upon rotation of the said sleeve, a cap for closing the said substitute filling spout and means on said cap for engaging the said substitute filling spout and the said sleeve, and the said sleeve being operable thereby, and means for locking the said sleeve in predetermined position in the said substitute filling spout so as to lock the said cap thereon and the said valve in closed position.

WAYNE W. WALLACE.

No references cited.